(12) United States Patent
Shen et al.

(10) Patent No.: US 8,678,283 B2
(45) Date of Patent: Mar. 25, 2014

(54) TWO-DIMENSIONAL ARRAY CODE

(75) Inventors: Wei Shen, Beijing (CN); Jiabing Liu, Beijing (CN); Xiaowei Guo, Beijing (CN); Liduo Zhong, Beijing (CN)

(73) Assignees: Gmedia Technology (Beijing) Co. Ltd., Beijing (CN); Beijing Sigone Venture Limited, Beijing (CN)

( * ) Notice: Subject to any disclaimer, the term of this patent is extended or adjusted under 35 U.S.C. 154(b) by 322 days.

(21) Appl. No.: 13/263,916

(22) PCT Filed: Apr. 12, 2010

(86) PCT No.: PCT/CN2010/000477
§ 371 (c)(1),
(2), (4) Date: Oct. 11, 2011

(87) PCT Pub. No.: WO2010/115351
PCT Pub. Date: Oct. 14, 2010

(65) Prior Publication Data
US 2012/0031973 A1    Feb. 9, 2012

(30) Foreign Application Priority Data
Apr. 10, 2009 (CN) .......................... 2009 1 0081773

(51) Int. Cl.
*G06K 19/06*    (2006.01)
(52) U.S. Cl.
USPC .......................................... 235/454; 235/494
(58) Field of Classification Search
USPC ........... 235/454, 494; 340/745, 750; 358/1.11
See application file for complete search history.

(56) References Cited

U.S. PATENT DOCUMENTS

| | | | |
|---|---|---|---|
| 6,196,466 B1* | 3/2001 | Schuessler | 235/494 |
| 7,738,865 B2 | 6/2010 | Hughes et al. | |
| 2009/0200386 A1* | 8/2009 | Longacre, Jr. | 235/494 |
| 2011/0205569 A1* | 8/2011 | Eschbach et al. | 358/1.11 |

FOREIGN PATENT DOCUMENTS

| | | |
|---|---|---|
| CN | 1076798 A | 9/1993 |
| CN | 1801188 A | 7/2006 |
| CN | 101093553 A | 12/2007 |

OTHER PUBLICATIONS

International Search Report dated Jul. 22, 2010.

* cited by examiner

*Primary Examiner* — Allyson Trail
(74) *Attorney, Agent, or Firm* — Laurence A. Greenberg; Werner H. Stemer; Ralph E. Locher

(57) ABSTRACT

The present invention relates to a two-dimensional array code. The two-dimensional array code comprises a plurality of code characters arranged into a two-dimensional array, wherein each of the code characters corresponds to a bit group representing information; and a locating mechanism, for defining size and/or direction of the two-dimensional array arranged by the code characters, wherein each of the code characters belongs to one of a plurality of character groups, characters in each of the character groups have at least a identical or similar feature, and characters belong to a same character group are mapped to a same bit group. According to the present invention, at least one of the plurality of character groups comprises two or more code characters. The present invention greatly reduces the cost for issuing a two-dimensional code, and significantly increases the user convenience. This two-dimensional array code has high compatibility for user mobile terminals. In addition, the entire system apparently improves its safety and stability, and is suitable for the present network application environment.

20 Claims, 7 Drawing Sheets

| Character group | Binary bit group | geometry and image feature | Exemplary character |
|---|---|---|---|
| Group 1 | 000 | longitudinal symmetry, and lateral symmetry | HIOXox |
| Group 2 | 001 | longitudinal symmetry, but no lateral symmetry | BCDE |
| Group 3 | 010 | lateral symmetry, but no longitudinal symmetry, the number of dark spots in upper region is greater than the number of dark spots in lower region | TVYv |
| Group 4 | 011 | lateral symmetry, but no longitudinal symmetry, the rest | AMUWimnw |
| Group 5 | 100 | no longitudinal symmetry and no lateral symmetry, the number of dark spots in upper region is greater than the number of dark spots in lower region | FPr |
| Group 6 | 101 | no longitudinal symmetry and no lateral symmetry, the number of dark spots in lower region is greater than the number of dark spots in upper region | JLQbdgjy |
| Group 7 | 110 | no longitudinal symmetry and no lateral symmetry, but with same vertical mirror image and horizontal mirror image | NSZsz |
| Group 8 | 111 | the rest | rest characters |

FIG. 5

TWO-DIMENSIONAL ARRAY CODE

TECHNICAL FIELD

The present invention generally relates to a two-dimensional array code, and more particularly, to a two-dimensional array code that comprises characters and is suitable for transmitting through a short message.

BACKGROUND

At present, more and more applications come out in which two-dimensional codes are used instead of paper vouchers, such as discount vouchers, shopping vouchers, and the like presenting in the form of two-dimensional codes displayed on mobile phones, or VIP cards, identity cards, and the like in the form of two-dimensional codes. Compared to a traditional paper coupon, a coupon in the form of a two-dimensional code is able to reduce cost and is convenience for transmitting and distributing. Customers can store a mass of electronic coupons in a mobile terminal such as a mobile phone, which can readily be managed and used. While implementing the identification of a note, VIP qualification, and identity in the form of a two-dimensional code, various encryption, signature and authentication technologies can easily be applied, which efficiently improves the security requirement of these applications. Therefore, the applications have a wide application prospect.

A two-dimensional code is a black and white image distributed in two-dimensional directions according to a certain rule by a specific geometry pattern, to represent information, wherein black and white represent "0" and "1" bit in a binary system. A two-dimensional code is recognized through an image input device or an optical scanning device. Because a two-dimensional code is able to express information simultaneously through horizontal direction and vertical direction, a mass of information can be expressed in a small area. Currently known two-dimensional codes can mainly be classified into stacked two-dimensional codes and matrix two-dimensional codes. Stacked two-dimensional codes are formed by stacking a plurality of shortened one-dimensional codes. Matrix two-dimensional codes are in the form of matrixes. In the position of a corresponding element, the appearance of a spot or other shape presents a binary "1", and the absence of a spot presents a binary "0".

However, the existing two-dimensional codes are transmitted and stored in graphic forms, thus there are a lot of inconveniences in applications. FIG. 1 shows a block diagram of the transmitting of a two-dimensional code in prior art between a network server and a mobile terminal. A customer 104 selects information (such as discount vouchers) for which he or she desires by visiting a bar code server 101. The coding information corresponding to the bar code of the selected information is transmitted to a coder 102. In the coder 102, the coding information of the bar code is encoded into a two-dimensional array code, and the two-dimensional array code in the form of an image file is transmitted to a mobile terminal 105 of the customer 104 through an issuing module 103. The received two-dimensional code image is stored in the memory of the mobile terminal 105. The image may be displayed to a code reading device for reading, through a screen of the mobile terminal 105, when needed. When a mobile terminal A needs to transmit a two-dimensional code it stored to a mobile terminal B, it transmits the two-dimensional code picture to the mobile terminal B; or the mobile terminal A displays the two-dimensional code on a screen for the mobile terminal B to capture by a camera or other image reading devices.

Because two-dimensional codes in prior art are propagated in the form of images, it needs to occupy more communication resources, which means longer communication elapsed time and higher communication cost for customers. Moreover, propagating in the form of images has limits to receiving devices (such as mobile phones) and communication networks. Many users' mobile phones may not be able to receive and transmit two-dimensional code images (such as by ways of multimedia messages). Or a two-dimensional code image is lost due to a communication network cause. Both of these two cases lead to lower arriving ratio of two-dimensional code applications based on the existing propagating manner. In addition, storing two-dimensional code images also leads to a relatively large memory capacity, which is hardly acceptable for a common mobile terminal with a limited memory capacity. The memory of images also makes it difficult for customers to quickly and accurately find out needed two-dimensional code images.

Short messaging service is one of the widely accepted and used mobile services. Almost all mobile terminals support short messaging service. Short messaging service has benefits of low cost, high accessible issuing ratio (arriving ratio), and lower data storage capacity. Short messaging service needs not to be adapted in terms of the size and resolution of a user's mobile terminal. Implementing the propagation of two-dimensional codes through short messages can solve the problems above.

Therefore, it is desirable that the present invention provides a improved two-dimensional code, which is able to have the existing two-dimensional code's advantage of two-directional information presentation with a large data capacity, while avoid the problem that a existing two-dimensional code has to be propagated through image due to the using of "black" and "white" to present bits. Moreover, it is desirable that the reading of the improved two-dimensional code is quick and accurate.

SUMMARY OF INVENTION

It is an object of the present invention to provide a new two-dimensional code. The two-dimensional code can be configured by code characters. Therefore, it is suitable for transmitting through a short message, and can be displayed on an electronic screen and read through an electronic screen.

According to one aspect of the present invention, a two-dimensional array code is provided, which comprises: a plurality of code characters arranged into a two-dimensional array, wherein, each of the code characters corresponds to a bit group presenting information; and a locating mechanism, for defining size and/or direction of the two-dimensional array arranged by the code characters, wherein, each of the code characters belongs to one of the plurality of character groups, characters in each of the character groups have at least an identical or similar feature, and characters belong to a same character group are mapped to a same bit group. According to the present invention, at least one character group of the plurality of character groups comprises two or more code characters.

According to the present invention, the array may have a rectangle, a diamond, a triangle, a circle, a trapezoid or there combinations.

According to the present invention, the locating mechanism may have at least one locating character, which is different from that of the code characters. The locating character may be arranged inside the two-dimensional array, and may have a fixed positional relationship with the two-dimensional array of the code characters, or the locating character may be arranged outside the two-dimensional array, and may have a fixed positional relationship with the two-dimensional array of the code characters. According to some embodiments of the present invention, the locating characters may comprises "★", "○", "●", "◉", "◇", "◆", "□", "■", "△", "▲", or "═" selected from GB2312, or "#", "+", "=" in half-width. Besides, the locating mechanism may have a shape feature of the two-dimensional array, or the combination of the locating characters and a shape feature of the two-dimensional array.

Especially, the code characters may be arranged into a rectangular array, and the locating mechanism may have at least two locating characters arranged at the upper right corner and lower right corner of the rectangular array respectively. In a alternative embodiment of the present invention, the locating mechanism may have at least one locating character arranged at the vertex of the triangular array. In another alternative embodiment of the present invention, the locating mechanism may have at least one locating character arranged inside the array.

According to another aspect of the present invention, a two-dimensional array code system is provided, which comprises: an electronic screen; a two-dimensional array code displayed on the electronic screen for optical reading, the two-dimensional array code comprises: a plurality of code characters arranged into a two-dimensional array, wherein each of the code characters corresponds to a bit group presenting information; and a locating mechanism, for defining size and/or direction of the two-dimensional array arranged by the code characters, wherein, each of the code characters belongs to one of the plurality of character groups, characters in each of the character groups have at least an identical or similar feature, and characters belong to a same character group are mapped to a same bit group, and wherein the orientation of the array of the two-dimensional array code has a fixed angular relationship with the electronic screen; and an optical reading device, for reading the two-dimensional array code.

The optical reading device may employ the locating mechanism of the two-dimensional array code, with the cooperation of at least one side of the electronic screen, to determine the size and/or direction of the two-dimensional array, so as to facilitate the reading of the two-dimensional array code. Especially, the at least one side of the electronic screen may be at least a straight side, which is perpendicular with the rows of the two-dimensional array.

Likewise, the locating mechanism may have a locating character which is different from that of the code characters, and the locating mechanism further may have a shape feature of the array.

The two-dimensional array code of the present invention is able to have the existing two-dimensional code's advantage of two-directional information presentation with a large data capacity, while avoid the problem that a existing two-dimensional code has to be propagated through image due to the using of "black" and "white" to present bits. Moreover, it is desirable that the reading of the improved two-dimensional code is quick and accurate. The present invention greatly reduces the cost for issuing an electronic voucher, and significantly increases the user convenience. This two-dimensional array code has high compatibility for user mobile terminals. In addition, the entire system apparently improves its safety and stability, and is suitable for the present network application environment.

BRIEF DESCRIPTION OF THE DRAWING FIGURES

In order to understand the manner in which embodiments of the present invention are obtained, a more particular description of various embodiments of the invention briefly described above will be rendered by reference to the appended drawings. Understanding that these drawings depict only typical embodiments of the invention that are not necessarily drawn to scale and are not therefore to be considered to be limited of its scope, the embodiments of the invention will be described and explained with additional specificity and detail through the use of the accompanying drawings in which:

FIG. 1 schematically illustrates the transmitting of a two-dimensional code between a server and a mobile terminal in prior art;

FIG. 2 schematically illustrates several embodiments of the two-dimensional array code of the present invention;

FIG. 5 shows an exemplary dividing of text character groups according to another embodiment of the present invention;

Figure 7:
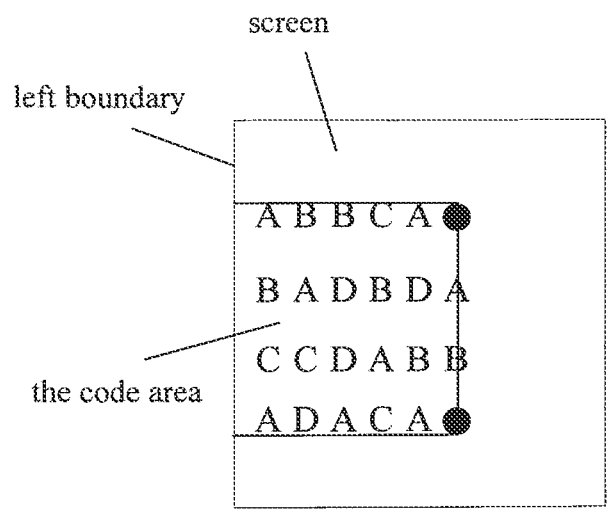
Figure 8:
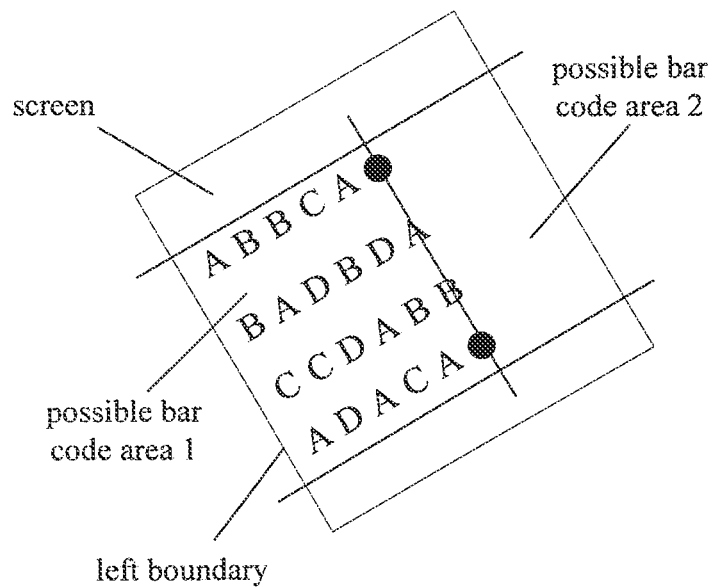

FIG. 7 exemplarily illustrates the locating of a two-dimensional array code, according to an embodiment of the present invention; and FIG. 8 exemplarily illustrates the locating of a two-dimensional array code, according to another embodiment of the present invention.

DETAILED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled.

In this context, the terminology "wireless" and its derivation can describe electromagnetic radiation that is able to use modulation, circuits, devices, systems, methods, technologies, communicating channels and the like, which transmit data through non-solid medium. The terminology dos not mean the related device can not include any wire-line, though it may be so in some embodiments.

Referring to FIG. 2 first, FIG. 2 schematically illustrates several embodiments 201-206 according to the two-dimensional array code of the present invention. According to the two-dimensional array code of the present invention, the two-dimensional array code may have a plurality of code characters (such as the characters "A", "B", "C" and the like, graphically shown in FIG. 2), and the code characters are arranged into a two-dimensional array. In a two-dimensional array, each character may correspond to a bit group representing intended information. Thus, respectively mapping the code characters of the two-dimensional array code to their corresponding bit groups makes the recovery of the information expressed by this two-dimensional array code according to coding rules possible. As to information coding rules, those skilled in the art may use all kinds of existing coding methods. The present invention is not so limited in this respect, and it is not necessary to give more details here, in order not to blur the present invention.

According to the present invention, the array can be a rectangle (such as the two-dimensional array code 201 in FIG. 2), a diamond (such as the two-dimensional array code 202 in FIG. 2), a triangle (such as the two-dimensional array code 203 in FIG. 2), a circle (such as the two-dimensional array code 204 in FIG. 2), a trapezoid (such as the two-dimensional array code 205 in FIG. 2), and their combinations (not shown). The array can be of various sizes, such as 4×4, 4×5, 5×5 and the like. The present invention is not so limited in this respect.

According to the present invention, the code character may be GB2312 codes, ASCII codes, numerals and English alphabets, full-width English alphabets, Chinese characters, half-width characters or the combinations of these characters.

According to a preferred embodiment of the present invention, a two-dimensional array code may have a locating mechanism, which helps the optical reading device to quickly define the size and/or the direction of the two-dimensional array arranged by the code characters when the two-dimensional array code is optically read, so as to facilitate the reading of the code characters of the two-dimensional array code. Especially, when the two-dimensional array code of the present invention is transmitted by a short message and read on the screen of a mobile phone, the locating mechanism helps to divide up the area of the two-dimensional array from a short message text.

According to a preferred embodiment of the present invention, the locating mechanism may have at least one locating character different from that of the code characters. For example, the locating characters may be "★", "○", "●", "◉", "◇", "◆", "□", "■", "∆", "▲", or "≡" selected from GB2312, or "#", "+", "=" and the like in half-width. Because geometrical features of the selected locating characters are obviously different from that of the other code characters, some simple searching algorithms can be employed to quickly define their locations from the entire image without the help of the complicated OCR technology. The number of the locating characters can be one, two, or more. Those skilled in the art can determine the number, as needed. The present invention is not so limited in this respect. As for reading a two-dimensional array code from a short message, it is helpful to have blank space around the array code to isolate it from other text. However, when there are more than two locating characters, it may not be limited to have the blank space outside the two-dimensional array code. Take a rectangular array code with three locating characters (such as the rectangular array code 207) as a example, the code may adjoin to other text in any direction of up, down, left or right and still be able to be located normally.

As the two-dimensional array codes 201-209 shown in FIG. 2, in some exemplary embodiments of the present invention, a locating character can be arranged inside a two-dimensional array, and has a certain location relationship with a two-dimensional array of the code characters, such as in the center of the two-dimensional array code (such as the two-dimensional array codes 202, 203 and the like), at the upper right corner and lower right corner of the two-dimensional array code (such as the two-dimensional array code 201). In an alternative embodiment of the present invention, the locating character is arranged outside the two-dimensional array (as the two-dimensional array code 206 shown), and also has a certain location relationship with the two-dimensional array of the code characters. According to a preferred embodiment of the present invention, the relationship between the locating character and the two-dimensional array is fixed and known by a reading device, and then the reading device can immediately find the locating character and determine the size and/or direction of the two-dimensional array arranged by the code characters. It can further improve the speed and convenience of reading the two-dimensional array code of the present invention.

In addition, according to some embodiments of the present invention, the shape feature of a two-dimensional array code can also be the locating mechanism or accessory locating mechanism. Especially to a non-rectangular two-dimensional array code, locating the two-dimensional array through recognizing the shape feature of the two-dimensional array code may omit the locating character (such as the two-dimensional array code 208). The applicant of the present application further find out that, when reading a two-dimensional array code displayed on a electronic screen, the relationship between the electronic screen and the two-dimensional array code can be sufficiently utilized to locate the two-dimensional code. One optimal way is to utilize at least one side of the electronic screen.

Take code 209 in FIG. 2 for example, the code 209 has two locating characters situated at the upper right corner and lower right corner of the inside of code. When the locating algorithm finds this pair of locating characters, it may search, in the left side of the line connecting the centers of this pair of locating characters, for a straight line parallel to this connecting line. If such a straight line is found, the straight line is the left side/boundary of the screen. Then the code area is determined to be the area surrounded by these two parallel lines and the other two lines, which are perpendicular to the two parallel lines and respectively run across the upside of the upper right locating character and the downside of the lower right locating character, as shown in FIG. 7.

According to a preferred embodiment of the present invention, the locating mechanism may be locating characters, shape of the array, boundaries/sides of the screen and their combinations. Preferably, for a rectangular array code (referring to two-dimensional array code 201), the locating mechanism formed by the upper right corner and two special characters at the upper right corner, with the cooperation of the left boundary/side of the screen of the device, is able to implement the locating of the array code quickly. For a triangular array code (referring to two-dimensional array code 204), a locating character, with the cooperation of the boundary/side of the screen of the device, is able to quickly determine the size and the direction of the array code. For a circle array or a diamond array (referring to two-dimensional array code 202, or 203), only one locating character in the center of the array code or inside the array code, with the cooperation of the blank space around the array code, is able to quickly locate the array code. Of course, as those skilled in the art will appreciate, these are only exemplary embodiments of the two-dimensional array code, its locating mechanism and locating method of the present invention. These are not limits for the present invention.

In some embodiments of the present invention, a plurality of code characters arranged into a two-dimensional array in the two-dimensional array code may be equal-height. The adjacent code characters in the row direction of the two-dimensional array may have equal center distances. More preferably, the code characters may be equal-width characters. Moreover, the adjacent code characters in the column direction of the two-dimensional array may have equal center distances. More preferably, the code characters are full-width characters, such as full-width English alphabets or numbers (such as the two-dimensional array code 209 in FIG. 2) selected from GB2312. The advantage of selecting English alphabets or numbers in GB2312 as code characters is that: these characters are full-width characters, and equal-width and equal-height for fonts in most devices, so that the code shape is more regular. Moreover, the geometrical configuration of these full-width characters is rarely changing with fonts, and the size and character spacing are usually larger than half-width characters. These feathers make the reading of the code characters of full-width English alphabets or numbers easier.

As those skilled in the art will appreciate, the spacing of adjacent code characters in row direction and column direction can be any value greater than 0. According to some embodiments of the present invention, it is advantageous to the reading of the two-dimensional array code when the spacing of adjacent code characters in row and column direction is roughly greater than or equal to 1/16 of the character width. According to other embodiments of the present invention, the spacing of adjacent code characters in row direction and column direction is roughly greater than or equal to 1/8 of the character width. Of course, in different picking up and reading conditions, this limiting value will be different due to the interference of noise, font, background and the like. Greater or smaller value is possible and the present invention is not so limited in this respect.

Although several exemplary two-dimensional array codes are shown in FIG. 2, those skilled in the art should appreciate that, the character codes of the present invention are not limited to these described in the drawings and those in the specific embodiments above. Those skilled in the art could have other variations and alternative embodiments without departing from the spirit and scope of the present invention, all the variations and alternative embodiments should fall within the scope of the present invention.

Figure 3:
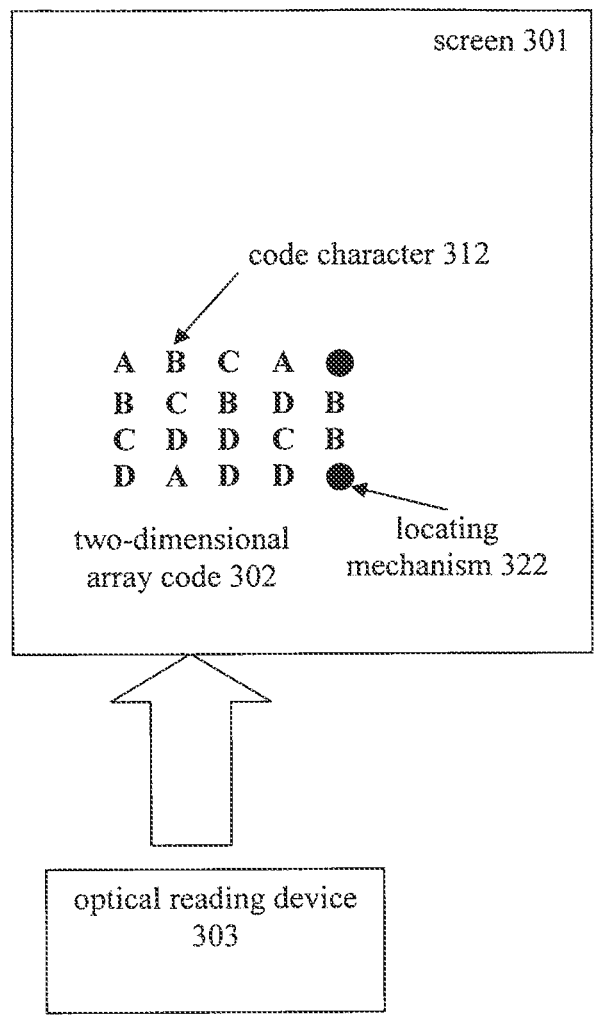
FIG. 3 shows a schematic illustration of a two-dimensional array code system, according to an embodiment of the present invention.
Figure 4:
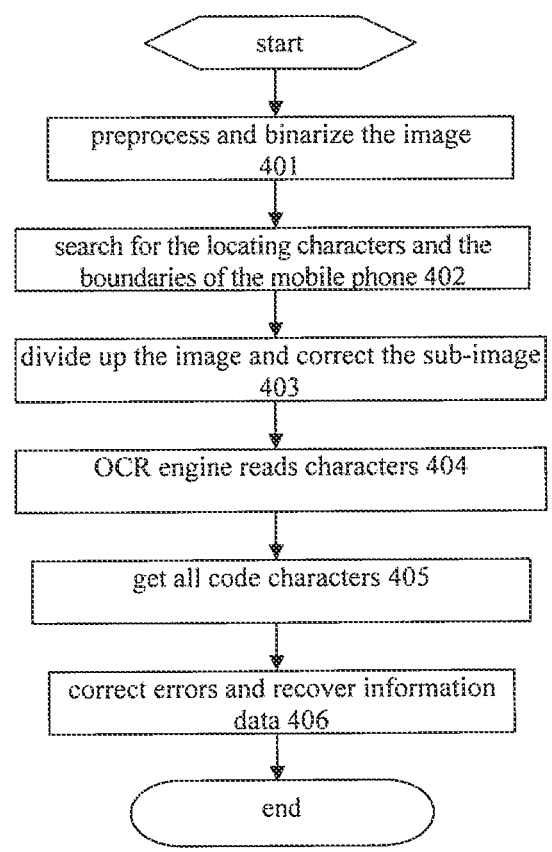
FIG. 4 shows a flow chart of reading a two-dimensional array code of the present invention from a mobile phone screen, according to an embodiment of the present invention.

It can be seen from the described above that, the two-dimensional array code provided in the present invention is formed by characters which are arranged into a two-dimensional array, and therefore replace the prior bit-representing method realized through black and white image blocks in a two-dimensional code. Therefore, the two-dimensional array code of the present invention is especially suited for wireless transmission, and for displaying and reading on an electronic screen such as the screen on a mobile phone. For example, referring to FIG. 3 and FIG. 4, FIG. 3 shows the schematic illustration of a two-dimensional array code system, according to an embodiment of the present invention; FIG. 4 shows the flow chart of the reading of the two-dimensional array code of the present invention on a mobile phone screen, according to an embodiment of the present invention.

The two-dimensional array code system 300 shown in FIG. 3 may have an electronic screen 301, a two-dimensional array code 302 displayed on the electronic screen 301 for optically reading, and an optical reading device 303. The electronic screen 301, for example, may be the screen of a mobile phone, a Personal Digital Assistant (PDA), a laptop computer, or other electronic screen capable of displaying characters. The two-dimensional array code 302 may be a two-dimensional array code of any type described in FIG. 2. Particularly, the two-dimensional array code in FIG. 3 may have a plurality of equal-height code characters 312 that are arranged into a two-dimensional array, wherein each of the code characters corresponds to a bit group representing information, and the adjacent code characters in the row direction of the two-dimensional array have equal center distances. The two-dimensional array code 302 may further have a locating mechanism 322 for defining the size and/or direction of the two-dimensional array arranged by the code characters. The optical reading device 303 can optically read the two-dimensional array code 302, which will be described in detail hereafter with respect to FIG. 4.

Particularly, the orientation of the two-dimensional array of the two-dimensional array code 302 has a fixed angular relationship with the electronic screen 301. This is advantageous for the optical reading device 303 to read the two-dimensional array code 302 quickly. For example, as it is illustrated in FIG. 3, the column of the two-dimensional array code 302 is parallel to the vertical boundary/side of the electronic screen 301. Thus, the optical reading device 303 can use the locating mechanism of the two-dimensional array code, with the cooperation of at least one side of the electronic screen, to determine the size and/or direction of the two-dimensional array code, so as to facilitate the reading of the two-dimensional array code. Specifically, as the shape of the two-dimensional array code 302 is regular due to the equal center distance between the adjacent code characters in the row direction, a simple method of projection in horizontal and vertical directions makes the optical reading device 303 be able to divide up all the characters properly from the corrected binary image.

According to a preferred embodiment of the present invention, the optical reading device 303 may use a locating mechanism and/or at least a straight side of the screen as a feature to divide up the array code from the rotated, inclined image, in order to facilitate image processing, such as rotating, calibrating, amplifying, filtering, matching, recognizing, and the like, so that the reading time is reduced, recognition calculation is decreased and the recognizable ratio is increased.

Figure 1:
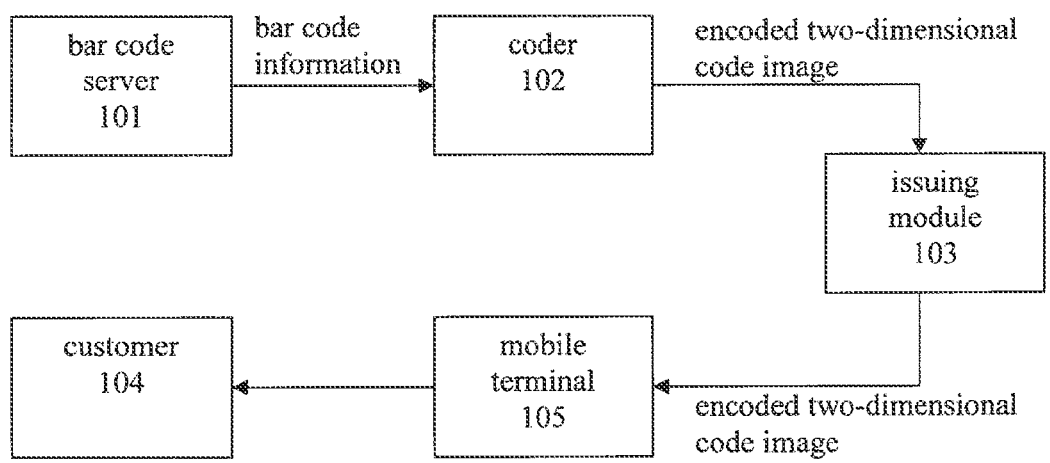

FIG. 4 shows the detailed flow chart of the reading of the two-dimensional array code 302 through an optical reading device 303. Firstly, an optical reading device picks up an image of the two-dimensional array code, and preprocesses and binarizes the image (step 401). Then, at step 402, the optical reading device searches for locating character(s) and boundaries/sides of the mobile phone. The fixed angular relationship among the two-dimensional array code, locating character(s), border lines of the mobile phone can determine the size, direction, location and the like of the two-dimensional array code. Accordingly, the optical reading device divided up the image and corrects the sub-images in accordance with the achieved information (step 403). As code 209 in FIG. 1 shows, after having found two locating characters, the angle formed between the line connecting the centers of this pair of locating characters and the vertical direction determines the direction of the code. The left and right boundaries/sides of the screen, being parallel to this connecting line, can be found in the left and right side of that connecting line, so as to determine two possible code areas (referring to FIG. 8). The optical reading device analyzes the image features in these two possible areas to determine which one is the real code area. Then, the OCR engine of the optical reading device may read all code characters from the corrected image (step 404), and get all the code characters (step 405) accordingly. After this, the optical reading device may use error-correcting method, well known to those skilled in the art, to correct errors and recover information data (step 406). Here, the reading of the two-dimensional array code is over.

Moreover, special configuration of the code characters in the two-dimensional array code can further facilitate the reading of the two-dimensional array code. According to some embodiments of the present invention, the code characters to be employed are divided in terms of geometrical symmetry features. Characters in each character group have at least an identical or similar geometrical symmetry feature, for example, a symmetry feature. Any character in each character group is mapped to a same bit group. Such a method of partitioning a character set (or sets) into character groups will significantly decrease character recognition calculation and memory consumption, and shorten character recognition/reading time.

Referring to FIG. 5, according to one specific embodiment of the present invention, English alphabets is employed as a code set for mapping bit stream groups. As it is shown in FIG. 5, all English alphabets can be divided into 8 character groups. Each character group may comprise a plurality of code characters. For example, character group 1 may comprise the English alphabets H, I, O, X, o, x, etc; while character group 5 may comprise the English alphabets F, P and r. The number of characters contained in each text character group may be same or not (for example, the character numbers of the character groups, in the shown embodiment, are not same). The present invention is not so limited in this respect.

Although what is shown in the Figure is a grouping of English alphabets, as those skilled in the art will appreciate, all kinds of texts, symbols suitable for text message to transmit can be divided into several clusters in terms of their features. For example, the text character groups can be formed through grouping GB2312 codes, ASCII codes, numerals and English alphabets or full-width English alphabets, in terms of their geometrical symmetry. According to an embodiment of the present invention, at least one character group may have two or more characters.

In one embodiment of the present invention, text characters of the text character set can be grouped according to their axial symmetry and rotational symmetry. As it is shown in FIG. 5, in the embodiment, English alphabet H, I, O, X, o, x included in character group 1 are of longitudinal Symmetry (up-down symmetry) and lateral symmetry (left-right symmetry) image and geometry features, and English alphabet N, S, Z, s and z included in character group 7 are not of longitudinal symmetry and lateral symmetry features, but are of image and geometry features with same or similar vertical and horizontal mirror images.

According to one embodiment of the present invention, each text character group may correspond to one binary bit group. In a particular embodiment, the bit number n corresponding to each text character group depends on the number m of text character groups. For example, in the illustrated embodiment, as the number m of text character groups is 8 (groups), then each text character group may correspondently represent one bit group having 3 (n=3) bits. Therefore, as shown in FIG. 1, character group 1 may correspond to binary bit group "000", character group 2 may correspond to binary bit group "001", and character group 3 may correspond to binary bit group "010", and so forth.

According to the present invention and according to the corresponding relationship between each character group and each bit group, each of the characters belonging to a same character group may be mapped to the binary bit group corresponding to the character group, thus each of the characters represents the same information. For example, two completely different character sequence HBT and character sequence ICV may represent completely same information, namely, both correspond to binary bit stream "000-001-010".

With this cluster method, a plurality of characters with a same feature can be employed as a same code character, such as characters A, H, T, U, V, Y, W, X, M and the like, with lateral symmetry feature, can all be coded with same information and decoded to same information. It also can improve the safety of the code, and reduce the risky of cracking the coding algorithm. These characters with a same feature can also be combined with a masking algorithm. When there is more than two same code characters, these same code characters can be replaced with a plurality of characters with the same feature by a masking algorithm (for example, A in code sequence ABACADAEAF can be replaced with characters like H, T, U, V, Y and the like, upon the request of masking, to form a new code sequence ABHCTDUEVF). By doing so, the safety of the code is improved. In other words, as those skilled in the art will appreciate, according to the embodiments of the present invention, there is actually a "many to one" mapping relationship between text characters and bit or bit group, which not only facilities optical recognition but also enhances information safety so as to avoid flagrant decoding and information misappropriating.

Figure 6:
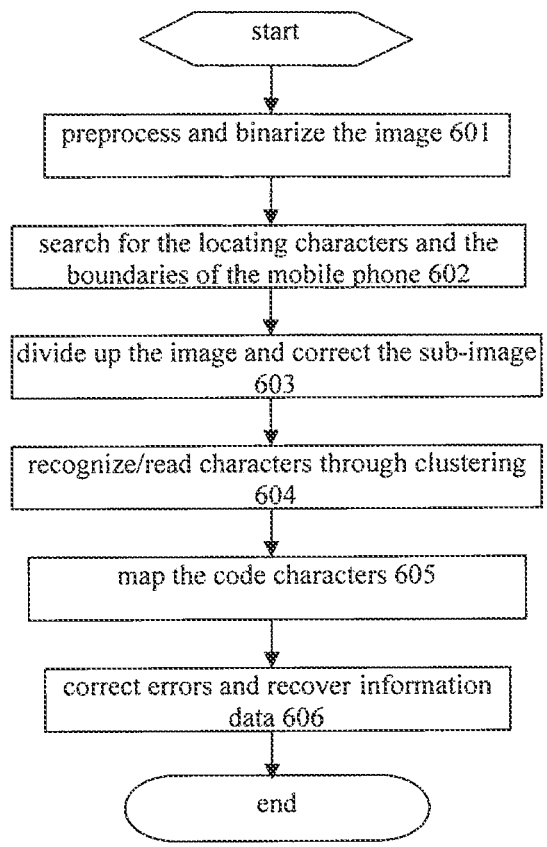
FIG. 6 shows a flow chart of reading a two-dimensional array code of the present invention from the mobile phone screen, according to another embodiment of the present invention.

Then referring to FIG. 6, FIG. 6 describes the procedure of reading a two-dimensional array code of the present invention through a simple cluster method. Firstly, acquiring an image of the two-dimensional array code (by a digital camera, for example), preprocessing and binarizing the image (step 601). Then, searching for the locating characters and the boundaries/sides of the mobile phone; and determining the size, direction or location and the like of the two-dimensional array code in terms of the fixed positional relationship of the two-dimensional array code, locating characters, and boundaries/sides of the mobile phone; and accordingly the optical reading device dividing up the image and correcting the sub-image in terms of the achieved information (steps 602 to 603). As code 209 shown in FIG. 1, after having found two locating characters, the angle formed between the line connecting the centers of this pair of locating characters and the vertical direction determines the direction of the code. The left and right boundaries/sides of the screen, being parallel to this connecting line, can be found in the left and right side of that connecting line, so as to determine two possible code areas (referring to FIG. 8), and analyze the image features in these two possible areas to determine which one is the real code area.

Now, characters can be recognized through dividing up and clustering from the corrected image (step 604). In the embodiment, whiling adopting such a grouping mapping method to select code characters, OCR recognition of characters is not needed. Reading characters only needs to simply determine their geometry features. For example, in a specific embodiment of the present invention, code characters may select full-width characters "A, E, O, L". These code characters can be recognized by utilizing simple symmetry. Character "A" is of lateral symmetry, character "E" is of longitudinal symmetry, character "O" is of lateral symmetry and longitudinal symmetry, and character "L" is of no lateral symmetry and no longitudinal symmetry. If character "V" appears in array code, it will be seen as character "A", for they have a same recognition feature. This simple cluster method makes the character recognition algorithm high efficiency.

Then, at step 605, mapping between code characters and bit streams is done in terms of the determined code character groups (to which the code characters belong) and the corresponding bit groups of such character groups. Likewise, error-correcting method, known by those skilled in the art, can be employed to correct errors and recover the original information data (step 606).

It can be seen that, this cluster method provided by the present invention sufficiently makes use of geometrical symmetry features of the code characters, so that it does not need to precisely OCR all the code characters. This lowers the requirements for the computation performance of the reading device, simplifies the image processing, and improves the speed and recognizable ratio of the recognition.

Especially, in case of reading a combination of a two-dimensional array code and other text on a screen, blank area is needed in particular area outside the code according to the number and location of locating characters and size of the code. The blank area shall not have any character, nor have obvious lines or noise interference in screen background. Take code 209 in FIG. 1 as an example, the code has two locating characters at the upper right corner and lower right corner. At least one blank column is needed at the right side of the code. Other text/content can be at the right side of the blank column. Thus, after two locating characters are found, it can be determined according to the blank column location that the two-dimensional code is at which side of the connecting ling that connecting the centers of these two locating characters. Take code 206 in FIG. 6 as another example, there are four locating characters in the code. A blank row or a blank column is not needed outside the code. When the four locating characters are found, the area defined by these four locating characters can be determined to be the code area.

The procedure described above may be stored in the memory of a mobile terminal as a set of instructions for execution. Moreover, the instructions for implementing the procedure above may alternatively be stored in order media. Besides, the instructions can be downloaded to a mobile terminal from a data network as a compiled and linked version.

Although the various embodiments are described herein using flow chart and/or state diagram, the present invention is not limited in these drawing and corresponding descriptions herein. For example, the flow does not need to be performed via every illustrated block or state, or strictly performed in the order herein illustrated or described. Moreover, other operations may also be added into the flow.

The inventions are not restricted to the particular details listed herein. Those skilled in the art having the benefit of this disclosure will appreciate that many other variations from the foregoing description and drawings may be made within the scope of the present inventions. Accordingly, it is the following claims including any amendments thereto that define the scope of the inventions. The terms and expressions which have been employed herein are used as terms of description and not of limitation, and there is no intention, in the use of such terms and expression, of excluding any equivalents of the features shown and described, and it is recognized that various modifications, variations, alternatives, and equivalents are possible within the scope of the claims. Accordingly, the claims are intended to cover all such modifications, variations, alternatives, and equivalents.

What is claimed is:

1. A two-dimensional array code, comprising:
a plurality of code characters arranged into a two-dimensional array, wherein each of the code characters corresponds to a bit group representing information; and
a locating mechanism, for defining size and/or direction of the two-dimensional array arranged by the code characters, wherein each of the code characters belongs to one of a plurality of character groups, characters in each of the character groups have at least an identical or similar feature, and characters belong to a same character group are mapped to a same bit group.

2. The two-dimensional array code of claim 1, wherein the array comprises a rectangle, a diamond, a triangle, a circle, a trapezoid or their combinations.

3. The two-dimensional array code of claim 1, wherein the locating mechanism comprises at least one locating character, which is different from that of the code characters.

4. The two-dimensional array code of claim 3, wherein the locating character is arranged inside the two-dimensional array, and has a fixed positional relationship with the two-dimensional array of the code characters.

5. The two-dimensional array code of claim 3, wherein the locating character is arranged outside the two-dimensional array, and has a fixed positional relationship with the two-dimensional array of the code characters.

6. The two-dimensional array code of claim 3, wherein the locating character comprises "★", "○", "●", "◉", "◇", "◆", "□", "■", "∆", "▲", or "▬" selected from GB2312, or "#", "+", "=" in half-width.

7. The two-dimensional array code of claim 1, wherein the locating mechanism comprises a shape feature of the two-dimensional array.

8. The two-dimensional array code of claim 3, wherein the locating mechanism further comprises a shape feature of the two-dimensional array.

9. The two-dimensional array code of claim 1, wherein the character groups are divided in terms of geometrical symmetry features.

10. The two-dimensional array code of claim 1, wherein at least one character group of the plurality of character groups comprises two or more code characters.

11. The two-dimensional array code of claim 1, wherein the code characters are arranged into a rectangular array, and the locating mechanism comprises at least two locating characters arranged at the upper right corner and lower right corner of the rectangular array respectively.

12. The two-dimensional array code of claim 1, wherein the code characters is arranged into a triangular array, and the locating mechanism comprises at least one locating character arranged at the vertex of the triangular array.

13. The two-dimensional array code of claim 1, wherein the code characters are arranged into a circle or diamond array, and the locating mechanism comprises at least one locating character arranged inside the array.

14. The two-dimensional array code of claim 1, wherein the code characters comprises characters contained in GB2312.

15. A two-dimensional array code system, comprising:
an electronic screen;
a two-dimensional array code displayed on the electronic screen for optical reading, the two-dimensional array code comprises: a plurality of code characters arranged into a two-dimensional array, wherein each of the code characters corresponds to a bit group representing information; and a locating mechanism, for defining size and/or direction of the two-dimensional array arranged by the code characters, wherein each of the code characters belongs to one of the plurality of character groups, characters in each of the character groups have at least an identical or similar feature, and characters belong to a same character group are mapped to a same bit group, and wherein the orientation of the array of the two-dimensional array code has a fixed angular relationship with the electronic screen; and an optical reading device, for reading the two-dimensional array code.

16. The two-dimensional array code system of claim 15, wherein the optical reading device employs the locating mechanism of the two-dimensional array code, with the cooperation of at least one side of the electronic screen, to determine the size and/or direction of the two-dimensional array, so as to facilitate the reading of the two-dimensional array code.

17. The two-dimensional array code system of claim 16, wherein the at least one side of the electronic screen is at least a straight side, which is perpendicular to the rows of the two-dimensional array.

18. The two-dimensional array code system of claim 16, wherein the locating mechanism comprises at least a locating character, which is different from that of the code characters.

19. The two-dimensional array code system of claim 18, wherein the locating mechanism further comprises a shape feature of the array.

20. The two-dimensional array code system of claim 16, wherein the locating mechanism comprises a shape feature of the array.

* * * * *